Nov. 26, 1968  B. C. WATSON  3,412,616
ACCELEROMETER
Filed Feb. 23, 1966  2 Sheets-Sheet 1

INVENTOR.
Barron C. Watson
BY
Roberts, Cushman & Grover
ATT'YS

Nov. 26, 1968    B. C. WATSON    3,412,616
ACCELEROMETER

Filed Feb. 23, 1966    2 Sheets-Sheet 2

United States Patent Office 3,412,616
Patented Nov. 26, 1968

3,412,616
ACCELEROMETER
Barron C. Watson, Cambridge, Mass., assignor, by mesne assignments, to the United States of America as represented by the United States Atomic Energy Commission
Filed Feb. 23, 1966, Ser. No. 529,289
8 Claims. (Cl. 73—492)

ABSTRACT OF THE DISCLOSURE

An accelerometer for industrial and military uses having a plurality of weights magnetically supported before impact and releasable by a predetermined change in energy to form dents in a deformable member to indicate final velocities. Means are provided to disable the accelerometer once it has been subjected to a shock sufficient to activate it.

This invention was made in the course of a purchase order under a contract with the United States Atomic Energy Commission.

This invention relates to accelerometers of the kind described in copending application Ser. No. 428,998, filed Jan. 29, 1965, now U.S. Letters Patent No. 3,389,606, issued June 25, 1968, designed, as related in that application, for industrial and military uses to obtain data from a single-pulse input which will enable reducing failure or assessing the resistance to failure of applications such as the response of vehicles and structures to nuclear weapon or chemical high explosive detonations; measurement of ground or water-borne shock waves; monitoring of aircraft components subject to failure from hard landing (that is, landing gear); and monitoring of the handling loads in shipping and the like.

The accelerometer in the aforesaid application is of the kind in which a plurality of weights are released by a predetermined change in energy to make dents in a deformable member, the volume of which can be translated into final velocities and hence development of an acceleration time history.

In the aforesaid application guides are employed for supporting the weights during their movement from an at rest position to positions of impact with the deformable member, with the result that there is a loss of energy through surface friction of the weights with the guiding surfaces and lateral constraint which must be taken into account in making final computations. It is the purpose of this invention to provide an accelerometer in which free movement of the weights is achieved so that the effect of surface friction and/or lateral constraint need not be taken into consideration. Other objects are to provide an accelerometer which will record the intensity and duration of the impact or acceleration; and to provide an accelerometer which, when it has once been subjected to shock of sufficient intensity to free the weights, will become disabled and hence will not record secondary shock.

The invention will now be described in greater detail with reference to the accompanying drawings wherein.

Figure 2:
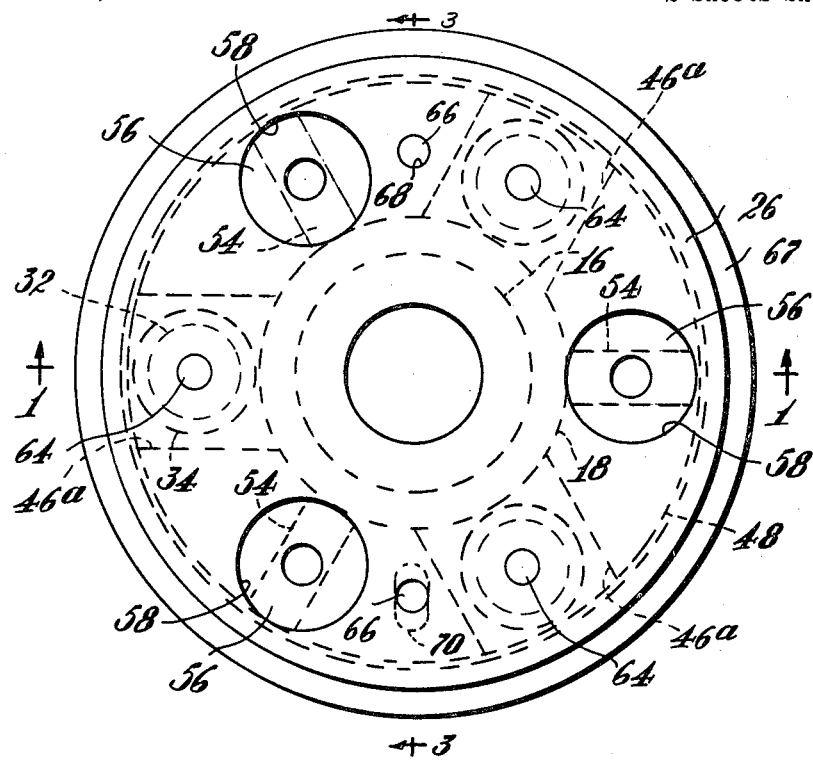
FIG. 2 is a plan view of FIG. 1.

As herein illustrated, the accelerometer is in the form of a right cylinder of about 1⅛ inches in diameter and about ⅝ of an inch long and accordingly can be installed for use without sacrifice of an appreciable amount of space, thus making it particularly useful in aircraft, missiles, and the like, where space is at a premium.

The accelerometer comprises a base part 10 in the form of a relatively thick rigid metal disc containing a center hole 12 and a concentric recess 14 in its lower surface. A hollow rigid metal post 16 is mounted with its lower end in the hole 12 so that the axis of the post is perpendicular to the upper surface of the base and is supported therein by engagement of a peripheral flange 18 on the post with a rigid metal ferrule 20 surrounding the post and resting on the upper surface of the base. The post is retained in position by a split locking ring 22 seated within an annular groove 24 in the portion of the post projecting into the recess 14.

The base 10 may be comprised of a relatively soft metal deformable by impact and is rotatable about the post 16 so that its upper surface, which constitutes an anvil or target 10a, may be repositioned to permit several recordings without replacement of the base. Optionally, the anvil or target may comprise a flat ring 10b recessed into the upper surface of the base, as shown in FIG. 2, which may also be rotated to present different portions of its surface to the impact bodies so that it may be used several times without replacement.

Figure 1:
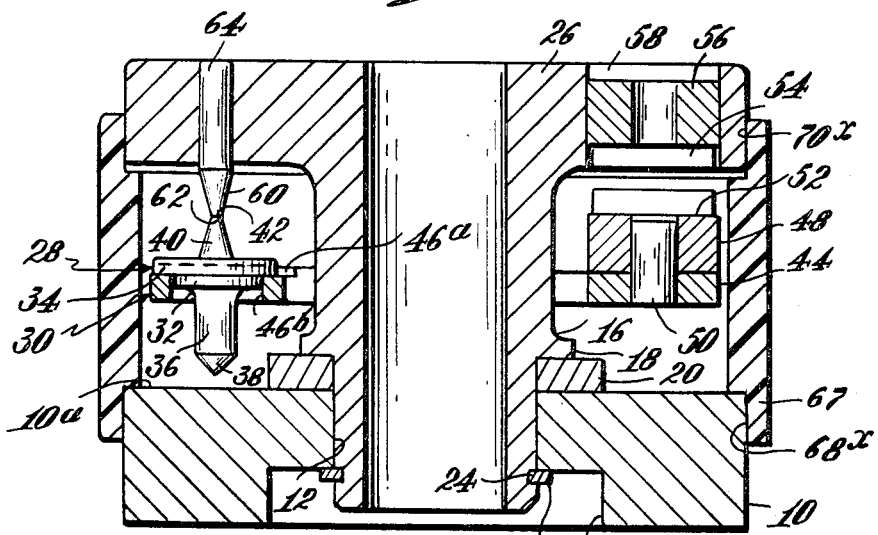
FIG. 1 is a vertical diametrical section through the accelerometer taken on the line 1—1 of FIG. 2.
Figure 2A:
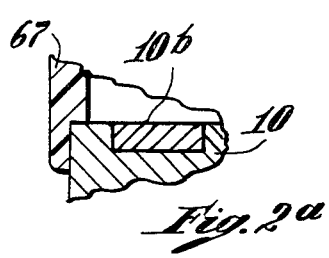
FIG. 2a is a fragmentary section of a modification in which the base contains a removable insert.

The impact bodies or weights 28, of which there are three arranged symmetrically about the post, each comprises a circular part 30 (FIG. 1) of two diameters providing a bush 32 and a shoulder 34. Axially aligned, centrally located parts 36 and 40 project from the opposite sides of the circular part comprising a pin 36 having a conical pointed end 38 for making a dent in the anvil and a pin 40 of cone-shaped having a relatively small flat end 42. A holder 44 supports the weights 28 above the anvil 10a or 10b with the pointed ends 38 of the pins 36 at a predetermined spacing therefrom which may be increased or decreased by increasing or decreasing the thickness of the shoulders 34 at their undersides. The holder, which is annular, surrounds the post 16 and has an inside diameter large enough so that it is free to move relative to the post 16 between a support 26 at the upper end of the post 16 and the base 10. Peripherally of the holder there are three radially disposed shallow recesses 46a arranged symmetrically about its center, each of which is greater in width than the diameter of the shoulder 34 and has at its bottom a circular hole 46b corresponding in diameter to the diameter of the bush 32 of one of the weights, so as to receive and support a weight, as shown in FIG. 1, with the bush 32 engaged within the hole 46b and the shoulder 34 in the recess 46a. The holder also has mounted on it symmetrically with respect to the center and between the holes 46b, three magnets 48, each of which is secured to the holder by a pin 50 (FIG. 1).

The support 26 has three magnets 56 fixed in holes 58 at a spacing corresponding to the spacing of the magnets 48 which in cooperation with the magnets 48 support the holder 44 in spaced relation to the base with the upper ends 42 of the pins 40 engaged with the lower end 62 of three spacer pins 64 fixed in the support 26 and having lower conical parts 60. To insure disabling of the accelerometer after functioning and thus eliminating spurious results, the adjacent ends 40 and 60 of the parts are made conical and the ends 42 and 62 of small diameter. The opposed faces of the magnets 48 and 56 are provided with slots 52 and tongues 54 respectively.

The magnets 48 and 56 are designed to support the holder 44 with the ends 42 and 62 of the pins 40 and 60 engaged until a predetermined acceleration or change in energy is reached or exceeded whereupon the holder will be released and the holder and weights will move as a unit toward the anvil 10a or 10b. Since the holder supports the weights only in one direction the weights are free from the influence of the holder when they strike the anvil 10a or 10b.

Figures 4, 5, 6:
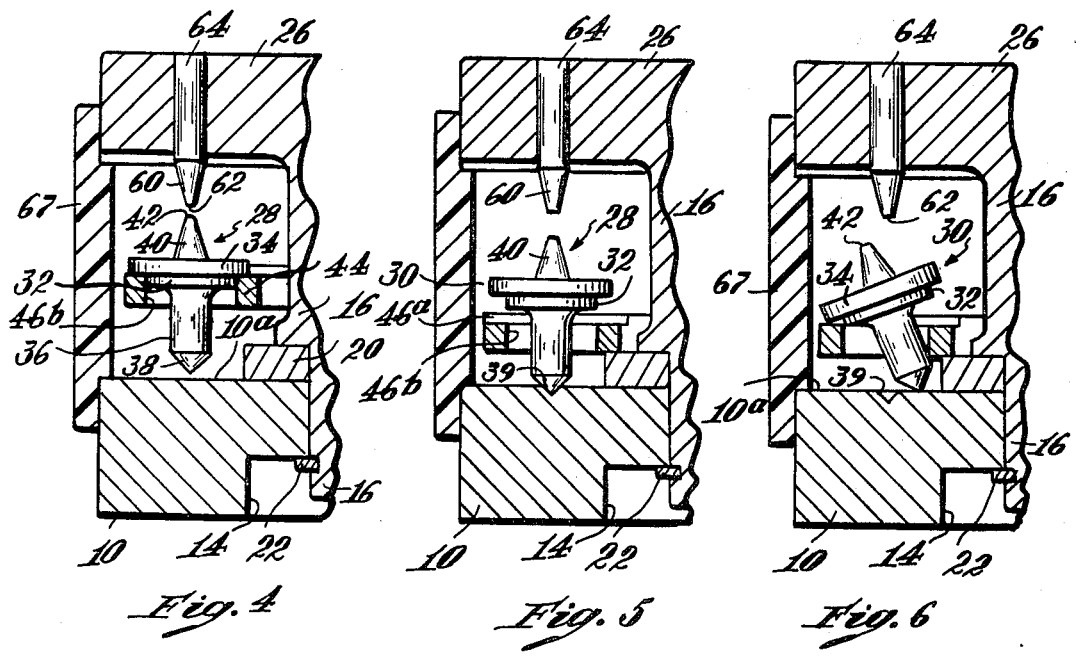
FIGS. 4, 5 and 6 are fragmentary vertical sections showing, respectively, release of the holder supporting a weight, impact and penetration of the weight into the deformable surface of the anvil and disabling of the accelerometer.

The inside diameter of the holder is less than the outside diameter of the ferrule 20 so that its movement toward the anvil is limited by contact with the ferrule. The sequence of movement is indicated in FIGS. 5 and 6 wherein FIG. 4 shows the position of the holder and one weight at the moment of release travelling freely toward the anvil; FIG. 5 shows the holder resting on the ferrule 20 and the weight making an impression 39 in the anvil; and FIG. 6 shows the weight tipped over to one side after having made an impression as indicated at 39. Once the pins 40 and 60 are disengaged from each other it is highly improbable that the several weights would become repositioned of themselves and hence once the accelerometer has been subjected to a shock of sufficient intensity to effect its operation, it is for all practical purposes disabled and will remain disabled until it is disassembled and the parts repositioned for the next use.

Figure 3:
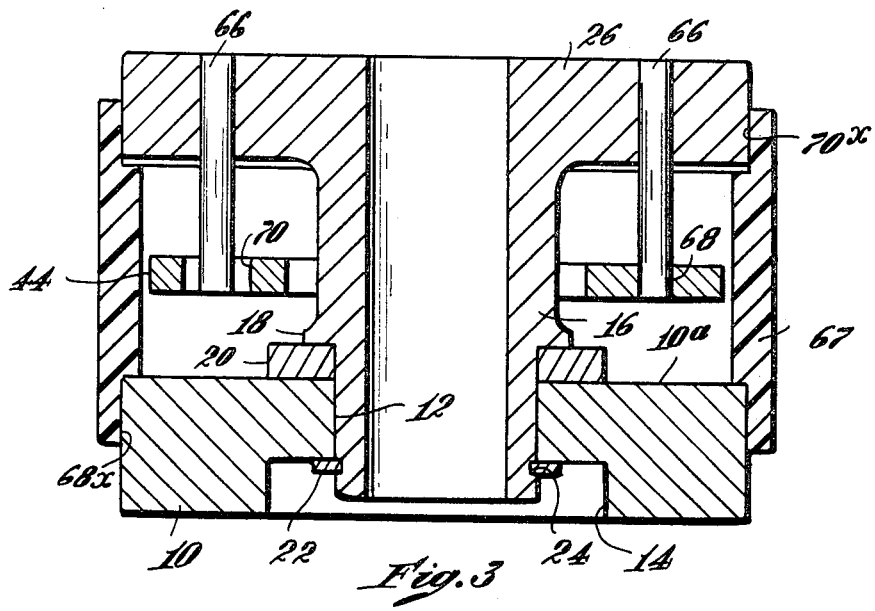
FIG. 3 is a diametrical section taken on the line 3—3 of FIG. 2.

In order to prevent the holder 44 from rotating about the axis of the post 16, two spindles 66—66 (FIG. 3) are fixed in the support 26 with their lower ends projecting into holes 68 and 70 in the holder, the latter hole 70 being of larger diameter than the spindle 66 so as to enable freedom in assembling the component parts for operation.

In order to exclude dirt and other extraneous matter and to prevent accidential displacement of the weights in handling and also to permit inspection, a transparent plastic skirt 67 containing grooves 68x and 70x at its opposite ends is mounted between the base 10 and support 26 during assembly so as to be locked in place when the locking ring 22 is snapped into the groove 24 at the lower end of the post.

The weights 28 may be all the same mass or of different mass, may have the same or different size conical ends for penetration of the target and may be held in positions that allow different distances of travel before the weight strikes the anvil. The anvil or target may be made of different kinds of metal and will, of course, be selected in accordance with the intensity of the shock expected and the mass of the weights employed. After use the base 10 may be rotated to position a fresh portion of the anvil 10a opposite the weights or a new base may be substituted for the used base. If the anvil is the insert 10b, the insert may be rotated or may be removed from the base and a new insert press into place.

The sensitivity of the instrument can be adapted to the expected impact by selection of impact masses and anvil hardness to give optimal size indents. Pulse or indent duration can be accommodated by selection of the spacings between the impact masses and the anvil.

It should be understood that the present disclosure is for the purpose of illustration only and that this invention includes all modifications and equivalents which fall within the scope of the appended claims.

I claim:

1. An accelerometer unit comprising rigidly spaced parts, one of said parts comprising an anvil, a weight adapted to make a dent in the anvil by impact therewith, a holder mounted between the parts on which the weight loosely rests with a part extending therefrom toward the anvil, a spacer operable by engagement with the other part to determine the position of the holder between the parts and hence the distance of the weight from the anvil, and magnetic means on said other part operative to hold the holder engaged with the spacer, said magnetic means having a predetermined holding power such as to release the weight when the unit is subjected to a predetermined energy change.

2. An accelerometer unit comprising rigidly spaced parts having confronting faces, one of said parts having at its confronting face an anvil adapted to be indented by impact, a holder mounted between the parts, said holder containing a hole through it, a weight mounted on the holder in the hole with a part at one side adapted by impact with said anvil to form a dent therein, a part at the other side engaged with the holder and supporting the weight loosely in said hole, and magnetic means at said other side of the holder and on the confronting side of said other part cooperable to support the holder at a predetermined distance from the anvil, said magnetic means having a predetermined holding power such as to release the holder when the accelerometer unit is subjected to a predetermined energy change.

3. An accelerometer unit comprising rigidly spaced parts having spaced confronting surfaces, one of said parts having on its confronting surface a target adapted to be indented by impact, a rigid holder mounted between the parts, said holder containing a hole through it, a weight mounted on the holder with a part of the weight extending through the hole at the side confronting the target which is adapted by impact with the target to form a dent therein, and a part engaged with the holder which supports the weight suspended in said hole, spacers extending respectively from the weight and the confronting surface of said other part toward each other, said spacers determining by engagement of their adjacent ends the distance of the holder from the target, and magnetic means on the holder and said other part cooperable to hold the holder spaced from the one part with the adjacent ends of the spacers engaged, said magnetic means having a holding power such as to release the holder when the accelerometer unit is subjected to a predetermined energy change.

4. An accelerometer according to claim 3, wherein the holder contains a pair of spaced guide holes, and a pair of correspondingly spaced guide pins are fixed to said other part so as to be slidably engaged with said guide holes while the holder is held spaced from the one part.

5. An accelerometer unit comprising rigidly spaced parts having spaced confronting surfaces, one of said parts having a confronting surface adapted to be indented by impact, a rigid holder mounted between the parts, said holder containing three holes arranged symmetrically about a common center, a weight having a striker pin at one end and a spacer pin at the other end, means supporting weights on the holder, one in each hole, with the striker pin extending through the hole toward the confronting surface of the one part and the spacer pin projecting toward the confronting surface of the other part, spacer pins fixed to said other part and projecting therefrom toward each of the spacer pins on the weights, and three pairs of magnets on the holder and other part situated symmetrically between the spacer pins operable to hold the holder spaced from the one part with the adjacent ends of the pairs of spacer pins in engagement, said magnets having a predetermined holding power such as to release the holder when the accelerometer unit is subjected to a predetermined energy change.

6. An accelerometer according to claim 5, wherein the adjacent ends of the spacer pins are tapered.

7. An accelerometer comprising a rigid disc, a hollow post at the center of the disc and projecting therefrom at right angles to the side of the disc from which it projects, a second rigid disc containing a center hole, said second disc being mounted on the post in spaced relation to the first disc, means on the post and second disc cooperable to hold the second disc at a predetermined spacing from the first disc, a circular holder containing a center hole mounted on the post between the discs, said holder being movable axially on the post between the discs, and containing three holes arranged symmetrically about the axis of the post, a weight mounted in each hole comprising a part larger than the hole resting against one side of the holder, and pins projecting in opposite directions therefrom toward the first and second discs, the pins at the one side constituting spacers which determine the position of the holder between the discs and the pins at the other side constituting hammers, and magnetic means for holding the holder with the spacer pins engaged with the disc at the one side, said magnetic means having a predetermined holding power such as to release the holder when the accelerometer is subjected to a predetermined energy change, and a target mounted on the disc at the other side for receiving the impact of the hammers.

8. An accelerometer according to claim 7, wherein there is means associated with the holder to hold the weights centered with respect to the holes in the holder.

References Cited

UNITED STATES PATENTS

| | | | |
|---|---|---|---|
| 2,445,307 | 7/1948 | Mindlin | 73—12 XR |
| 2,454,793 | 11/1948 | Grogan et al. | 73—492 XR |
| 2,583,004 | 1/1952 | McCorkle | 73—35 |
| 2,620,652 | 12/1952 | Hartmann | 73—35 |
| 2,986,615 | 5/1961 | Hardway | 73—514 XR |
| 2,950,622 | 8/1960 | De Vost | 73—492 |
| 3,109,309 | 11/1963 | Luttrell | 73—492 |

JAMES J. GILL, *Primary Examiner.*